(12) United States Patent
Cord et al.

(10) Patent No.: US 7,416,217 B2
(45) Date of Patent: Aug. 26, 2008

(54) GUIDE LOOP FOR A SAFETY BELT

(75) Inventors: Hans-Jörg Cord, Norderstedt (DE); Knut Janzen, Bad Bramstedt (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/553,571

(22) PCT Filed: Apr. 13, 2004

(86) PCT No.: PCT/EP2004/003857

§ 371 (c)(1),
(2), (4) Date: Feb. 28, 2007

(87) PCT Pub. No.: WO2004/091983

PCT Pub. Date: Oct. 28, 2004

(65) Prior Publication Data

US 2007/0170712 A1 Jul. 26, 2007

(30) Foreign Application Priority Data

Apr. 17, 2003 (DE) ................. 103 17 709

(51) Int. Cl.
*B60R 22/00* (2006.01)
(52) U.S. Cl. ................................ 280/801.1
(58) Field of Classification Search ......... 280/801.1, 280/808; 297/482, 483
See application file for complete search history.

(56) References Cited

U.S. PATENT DOCUMENTS

| 3,080,634 | A | * | 3/1963 | Lindblad ............... 24/579.11 |
| 4,378,947 | A |   | 4/1983 | Föhl |
| 4,469,352 | A | * | 9/1984 | Korner et al. ............ 280/801.2 |
| 4,789,186 | A | * | 12/1988 | Andersson ............... 280/808 |
| 5,732,974 | A |   | 3/1998 | Sayles |
| 5,918,903 | A | * | 7/1999 | Ito ........................... 280/801.1 |
| 5,941,604 | A |   | 8/1999 | Futschik et al. |
| 6,113,146 | A | * | 9/2000 | Mautsch et al. ........... 280/808 |
| 6,702,327 | B2 |   | 3/2004 | Janz |
| 6,726,287 | B1 |   | 4/2004 | Janz |
| 7,192,057 | B2 | * | 3/2007 | Moendel et al. .......... 280/808 |
| 2005/0012321 | A1 | * | 1/2005 | Moendel et al. .......... 280/808 |

(Continued)

FOREIGN PATENT DOCUMENTS

DE 22 28 127 A 1/1974

(Continued)

*Primary Examiner*—Faye M. Fleming
(74) *Attorney, Agent, or Firm*—Brinks Hofer Gilson & Lione

(57) ABSTRACT

A guide loop for a safety belt on motor vehicles, including a guide element provided with a guide slit for the safety belt, which is fixed to a vehicle by means of a fixing screw, and an adapter with a displacement body for limiting the slit width of the guide slit. The adapter is coupled to the inside of the fixing hole of the guide element and includes an opening penetrated by the fixing screw inserted through the fixing hole. The fixing hole of is formed by a boring, with a cross-section slightly larger than the external diameter of the screw in order to maximize the overlap between a bearing surface of the guide element and a head of the fixing screw. In addition, a number of grooves are distributed around the boring's circumference. When the adapter is mounted, the grooves accept fixing arms of the adapter.

7 Claims, 2 Drawing Sheets

U.S. PATENT DOCUMENTS

| | | | |
|---|---|---|---|
| 2006/0232056 A1* | 10/2006 | Moendel | 280/808 |
| 2007/0114776 A1* | 5/2007 | Durrer et al. | 280/808 |
| 2007/0114777 A1* | 5/2007 | Gray | 280/808 |

FOREIGN PATENT DOCUMENTS

| | | |
|---|---|---|
| DE | 29 45 174 A1 | 5/1981 |
| DE | 198 08 922 A1 | 9/1998 |
| DE | 202 05 570 U1 | 9/2002 |
| JP | 04113960 A * | 4/1992 |

\* cited by examiner

GUIDE LOOP FOR A SAFETY BELT

FIELD OF THE INVENTION

The invention relates to a guide loop for a motor vehicle safety belt.

BACKGROUND OF THE INVENTION

A guide loop for a safety belt in a motor vehicle is described in U.S. Pat. No. 6,702,327 B2. It includes a guide element having a guide slit, also designated as a belt eye, for the safety belt. The guide element is in the form of a one-piece metal body of steel plate manufactured by the cold forming process, which is fixed to the vehicle body by means of a fixing screw through a fixing hole in a mounting surface. A plastic adapter is connected to the guide element, and includes a cylindrical collar for fixing of the same which can be inserted in the fixing hole and also a fixable displacement body at the upper limit of the belt eye for limiting the width of the guide slit.

A disadvantage of this solution is that the screw head of the fixing screw is only supported on the guide element with an extremely small overlap due to the cylindrical collar of the adapter located inside the fixing hole. Because of this very slight overlap, there is significant risk that the fixing screw could pop out of the fixing hole of the guide elements in the presence of large loads, such as those occurring during a crash.

One solution is enlarging the overlap by means of correspondingly-sized washers or using fixing screws with special dimensions, in particular screws with large heads. However, this leads to increased costs and parts count. Therefore, an improved solution is required.

Starting from the guide loop described in U.S. Pat. No. 6,702,327, it is the objective of the present invention to create an improved device which effectively prevents the fixing screw head from popping out of the fixing hole, while attaching an adapter to the guide element with a simple and low-cost means.

SUMMARY OF THE INVENTION

In satisfying the above need, the present invention provides a guide loop including a guide element, having a fixing hole, and adaptor. The fixing hole is formed by a boring whose cross section is selected to be slightly larger than the external diameter of a screw shaft of a fixing screw in order to maximize the overlap of a bearing surface of the guide element with a head of the fixing screw. In addition, a number of grooves are included in the boring, distributed around its circumference, into which fixing arms of the adapter, pointing in the axial direction of the boring, extend when the adapter is mounted.

This arrangement is particularly advantageous if the grooves are distributed evenly over the circumference of the boring, so that they assist in centering the fixing screw.

In addition, the fixing arms are formed so as to be elastic within certain limits. The fixing arms include on their free end a hook-like structure pointing radially outwards engaging behind the walls of the guide element when mounted. The fixing arms or their hook-like structure may also be supplied with a guide chamfer.

Therefore, without the use of additional components such as washers and without the need to manufacture a special type of screw, the guide loop proposed here maximizes the overlap of the bearing surface of the guide element with the screw head of the fixing screw, and therefore prevents the screw head from popping out of the fixing hole. It is also advantageous to affix the adapter onto the guide element to prevent free and unwanted rotation in relation to the guide element, without reducing the overlap of the guide element by the screw head.

A further embodiment of the guide loop formed according to the present invention provides that the fixing arms, when mounted to the guide element, form a circle with a slightly smaller internal diameter than the internal diameter of the boring. The advantage of this design is that the reduction of the cross-section of the fixing arms ensures that the fixing screw lies against the fixing arms without causing any noise.

Finally, it is possible to form the guide loop so that the fixing arms of the adapter are positioned relative to the adaptor such that when the adapter is mounted, an approximately constant slit height of the guide slit results. This also ensures that the adapter cannot rotate freely in relation to the guide element when mounted, and therefore a constant, preferably parallel geometry remains in the guide slit for belt guidance.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The invention will be described in the following text by means of an embodiment shown in schematic form in the drawings. The drawings are as follows.

DETAILED DESCRIPTION OF THE INVENTION

Figure 1:
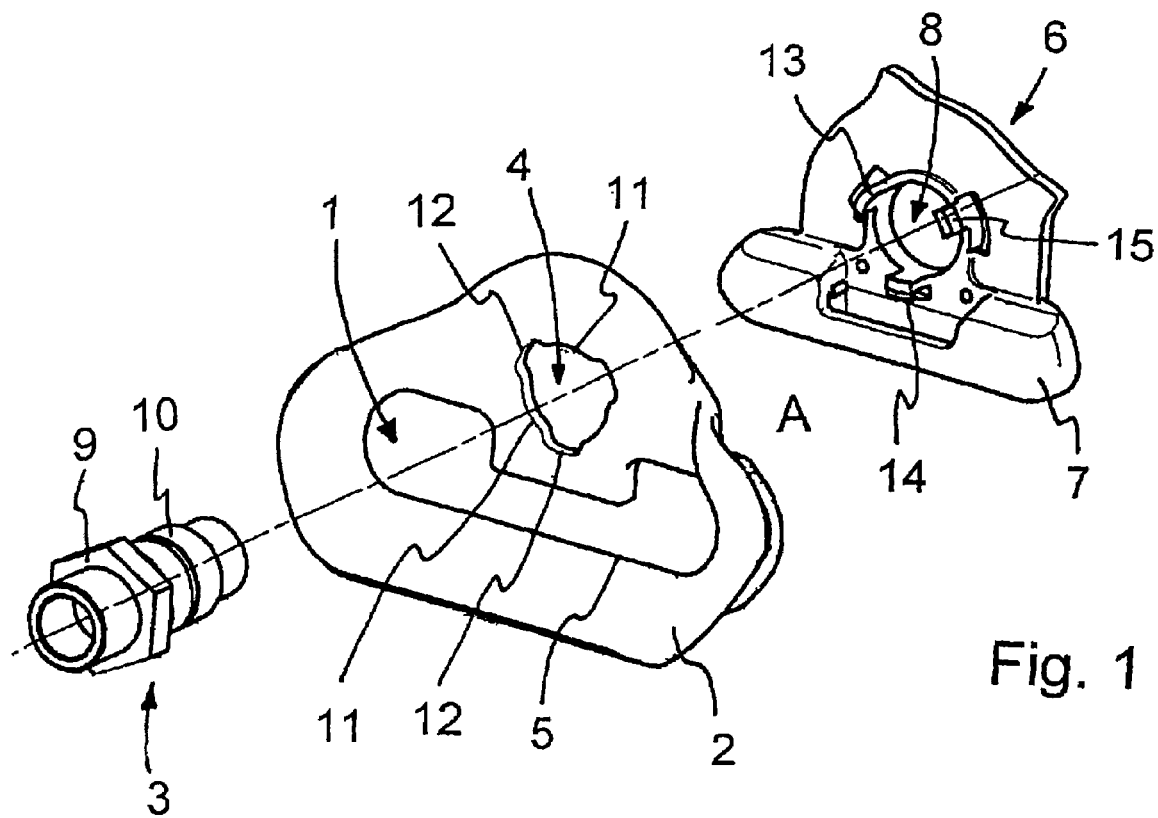
FIG. 1 is an exploded representation of the guide loop according to the present invention.

The guide loop for a safety belt according to the present invention is shown in an exploded view in FIG. 1. It includes a guide element 2, provided with a guide slit 1 for the safety belt (not shown), and also includes a fixing screw 3 and an adapter 6. The guide element 2 is fixed to a bearing component of the vehicle body (not shown), for example a vehicle pillar, by means of the fixing screw 3 inserted through a fixing hole in the form of a boring 4 in the guide element 2. For its part, the guide slit 1 includes a rounded running surface 5 for the safety belt, in order to ensure unhindered guidance of the same.

The guide element 2 is preferably manufactured as one piece of sheet steel by means of cold forming. Alternatively, it is formed as a steel plate moulded round with plastic.

Figure 2:
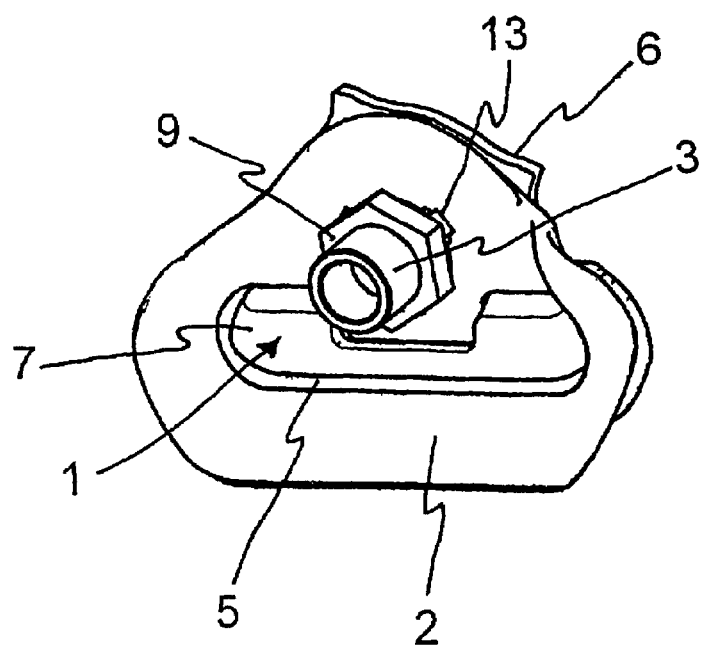
FIG. 2 is an assembled, perspective view of the guide loop of FIG. 1.

Between the guide element 2 and the bearing component, the adapter 6, is provided and preferably manufactured of plastic by an injection moulding process. It includes a displacement body 7, and an opening 8 penetrated by the fixing screw 3. The element 2 and the adapter 6 are arranged coaxially to one another, whereby the displacement body 7 serves to limit the height of the guide slit 1 (see FIG. 2).

In order to fulfil the task of preventing a screw head 9 of the fixing screw 3 from popping out of the boring 4 of the guide element 2, the cross-section of the boring 4 is selected so as to be only slightly larger than the external diameter of a screw shaft 10. This achieves the greatest-possible overlap of the bearing surface 11 of the guide element 2 by the screw head 9.

Further retention of the fixing screw 3 is achieved by the inclusion of two or more grooves 12 preferably distributed evenly over the circumference of the boring 4 of the guide element 2. Thus, when the guide loop is mounted, fixing arms 13 of the adapter 6 extend in the axial direction of the boring 4 and into the grooves 12. This provides a considerable improvement over the current state of the art in relation to disturbance-free function of the guide loop in case of a crash, along with securely fixing the adapter 6 to the guide element 2.

Figure 4:
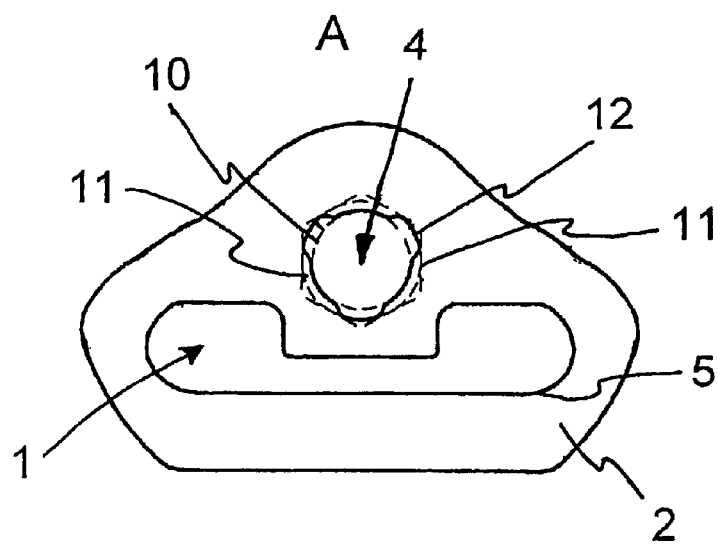
FIG. 4 is a front view of the guide element A included with the guide loop of FIG. 1.
Figure 5:
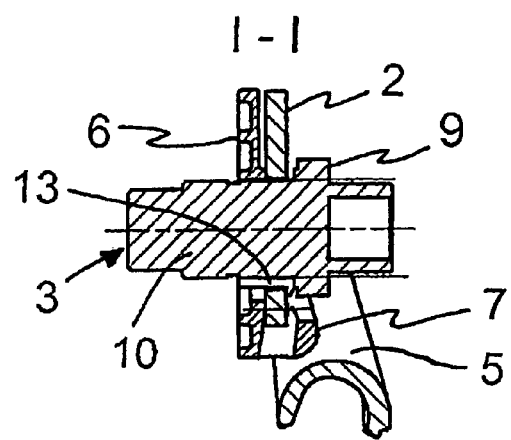
FIG. 5 is a section taken along line I-I of FIG. 3.

In a preferred embodiment, three grooves 12 are provided, between which areas of the free bearing surface 11 are created or maintained for the screw head 9 (FIG. 4).

As described in the introductory section of the description, and in U.S. Pat. No. 6,702,327 these features replace a cylindrical collar fixed to the adapter 6. As noted above, the cylindrical collar decreases the overlap of the bearing surface 11 of the guide element 2 by the screw head 9 in a disadvantageous manner.

In the present invention it is advantageous to form the fixing arms 13 of the adapter 6 to be elastic within limits, in order to make it easier to introduce them into the grooves 12 during assembly and in addition also to achieve a certain force fit.

Figure 3:
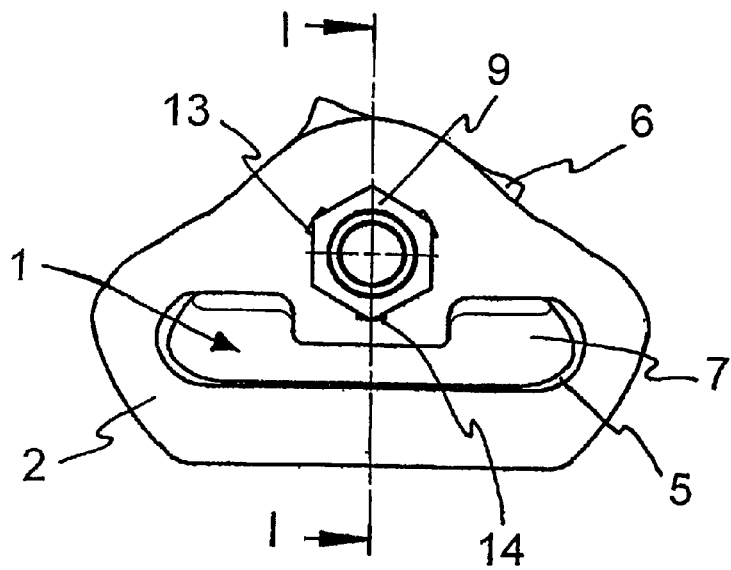
FIG. 3 is a front view of the guide loop of FIG. 2.

It is also advantageous, as shown in FIG. 1 and FIG. 3, to provide the fixing arms 13 with a hook-shaped structure 14 at their free ends facing radially outwards, which engage behind the walls of the guide element 2 when mounted and therefore provide additional interference or form fit.

In the same way it is again advantageous to provide a guide chamfer 15 on the fixing arms 13 or on the hook-shaped structure 14, to make the mounting of the adapter 6 on the guide element 2 easier.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A guide loop for a safety belt for a motor vehicle, comprising: a guide element provided with a guide slit for the safety belt, the guide loop adapted to be fixed to a component of the vehicle body by a fixing screw having a screw head having a first external diameter and a screw shaft having a second external diameter smaller than the first external diameter, and an adapter having a displacement body which blocks a portion of the guide slit when the adapter is mounted to the guide element, thereby limiting the slit height of the guide slit, whereby the adapter is coupled to the inside of a fixing hole of the guide element, and includes an opening penetrated by the fixing screw inserted through the fixing hole, the fixing hole being formed by a bore, whose internal diameter is selected to be smaller than the first external diameter of the screw head and larger than the second external diameter of the screw shaft in order to maximize the overlap between a bearing surface of the guide element and the screw head of the fixing screw, wherein the fixing hole also includes a plurality of grooves distributed about the circumference of the bore through which fixing arms of the adapter, oriented in an axial direction of the bore, extend to mount the adapter to the guide element.

2. A guide loop according to claim 1 wherein the fixing arms are formed as to be elastic within certain limits.

3. A guide loop according to claim 1 wherein the fixing arms include a hook-shaped structure at their free ends, the structure pointing outwards in a radial direction and engaging the guide element when mounted.

4. A guide loop according to claim 3 wherein the fixing arms or the hook-shaped structure are provided with a guide chamfer.

5. A guide loop according to claim 1 wherein the grooves are evenly distributed around the circumference of the bore.

6. A guide loop according to claim 1 wherein the fixing arms form a circle with a slightly smaller internal diameter than the internal diameter of the bore when the adapter is mounted.

7. A guide loop according to claim 1 wherein the fixing arms are positioned relative to the displacement body in such a way that an approximately constant slit height of the guide slit results when the adapter is mounted.

* * * * *